United States Patent
Choi et al.

(10) Patent No.: US 10,818,401 B2
(45) Date of Patent: Oct. 27, 2020

(54) SPRING APPARATUS AND SUPPORT APPARATUS USABLE IN NUCLEAR INSTALLATION

(71) Applicant: WESTINGHOUSE ELECTRIC COMPANY LLC, Cranberry Township, PA (US)

(72) Inventors: Joonhyung Choi, Lexington, SC (US); Yuriy Aleshin, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 851 days.

(21) Appl. No.: 15/013,073

(22) Filed: Feb. 2, 2016

(65) Prior Publication Data

US 2017/0221591 A1    Aug. 3, 2017

(51) Int. Cl.
*G21C 3/33* (2006.01)

(52) U.S. Cl.
CPC ............. *G21C 3/331* (2013.01); *Y02E 30/40* (2013.01)

(58) Field of Classification Search
CPC ................................... G21C 3/331; G21C 3/02
USPC .................... 376/285, 445, 178, 362, 364
See application file for complete search history.

(56) References Cited

U.S. PATENT DOCUMENTS

| | | | | |
|---|---|---|---|---|
| 4,938,919 A | * | 7/1990 | Rylatt | G21C 3/12 376/364 |
| 5,812,624 A | * | 9/1998 | Burfin | G21C 3/12 376/364 |
| 6,154,514 A | * | 11/2000 | Murakami | G21C 3/12 376/364 |
| 2011/0182395 A1 | | 7/2011 | Park et al. | |
| 2012/0087458 A1 | | 4/2012 | Choi et al. | |
| 2013/0003910 A1 | | 1/2013 | Park et al. | |

FOREIGN PATENT DOCUMENTS

| | | |
|---|---|---|
| JP | S55140193 A | 11/1980 |
| JP | H05142372 Z | 6/1993 |
| JP | 3546125 B2 | 7/2004 |
| WO | 2006/119140 A1 | 11/2006 |

OTHER PUBLICATIONS

International Search Report and Written Opinion of the International Searching Authority dated Nov. 2, 2017 (Forms PCT/ISA/220, PCT/ISA/210, PCT/ISA/237).
Extended European Search Report, dated Aug. 30, 2019, 11 Pages.

* cited by examiner

*Primary Examiner* — Lily C Garner
(74) *Attorney, Agent, or Firm* — K&L Gates LLP

(57) ABSTRACT

A spring apparatus in accordance with the disclosed and claimed concept is usable in a nuclear installation. In one embodiment, the spring apparatus includes a plurality of springs that are in a compressed state and that are compressively engaged with an upper core plate of a nuclear reactor when the reactor is in a cold condition. However, when the reactor is in a hot condition, a spring of the plurality of springs is in a free state wherein a free end of the spring is in an uncompressed state and is disengaged from the upper core plate. In another embodiment, the spring apparatus employs a support apparatus that is also in accordance with the disclosed and claimed concept and that includes one or more bumpers that engage the springs of a spring pack from the underside.

13 Claims, 7 Drawing Sheets

SPRING APPARATUS AND SUPPORT APPARATUS USABLE IN NUCLEAR INSTALLATION

BACKGROUND

1. Field

The disclosed and claimed concept relates generally to nuclear power generation equipment and, more particularly, to a hold-down spring apparatus usable with a fuel assembly of a nuclear reactor of a nuclear installation.

2. Related Art

Pressurized water nuclear reactors are well known in the relevant art. An exemplary pressurized water reactor is depicted generally in FIG. 1 and is described in greater detail below. The pressurized water reactor of FIG. 1 employs a set of hold-down springs that are depicted at the numeral 46 in FIG. 1, and another exemplary set of hold-down springs is depicted at the numeral 200 in FIG. 6. The hold-down spring pack provides a vertically downward force additional to gravity on the fuel apparatuses and is intended to retain the fuel apparatuses situated atop the lower core support plate and to resist the drag forces of the pressurized coolant fluid flow that is in an upward direction.

As is generally understood in the relevant art, the pressurized cooling fluid is at its greatest density when the nuclear installation is in a cold condition, such as during startup or just prior to shut down, and the fluid drag forces in the vertically upward direction on the fuel apparatuses are therefore at their greatest when the nuclear reactor is cold. When the reactor is hot, the coolant is at a relatively lower density and thus causes relatively reduced vertically upward drag forces on the fuel apparatus. However, neutron bombardment of the fuel apparatuses, which are formed primarily of Zirconium alloy, causes the fuel apparatuses to grow in size. Moreover, the coefficient of thermal expansion of the Zirconium alloy from which the fuel apparatuses are made is less than that of the stainless steel from which the reactor containment is made. Furthermore, neutron bombardment of the spring pack relaxes the springs to have a reduced spring force. Chronologically, a cold condition exists at initial fuel installation, and cold hydraulic forces occur when the reactor is first started. This is followed by reduction in force due to a difference in hold-down force due to thermal expansion between fuel and core internals, and then hot hydraulic force, which is followed by irradiation induced effect during operation (i.e., growth of fuel structure, irradiation relaxation of spring force).

It thus can be seen that complex factors are involved in the overall downward compressive load that is applied to the fuel apparatuses by the spring packs. As such, difficulty has been encountered in developing spring packs that will provide an appropriate level of downward force on the fuel apparatus at all times over the life of the components thereof. For instance, insufficient hold-down force leads to fuel assembly lift-off, which affects fuel behavior in normal and accidental conditions. Such fuel assembly lift-off could lead to fuel component damage including fuel rods, prevent RCCA insertion, etc. On the other hand, excessive hold-down force leads to fuel assembly distortion and may cause handling damage, increased water gaps and corresponding peaking factors. and IRI (Incomplete Rod Insertion). The hold-down force thus needs to be kept in a desirable range. Since this is difficult to achieve because of the complex loading issues mentioned above, improvements would be desirable.

SUMMARY

An improved spring apparatus in accordance with the disclosed and claimed concept is usable in a nuclear installation. In one embodiment, the spring apparatus includes a plurality of springs that are in a compressed state and that are compressively engaged with an upper core plate of a nuclear reactor when the reactor is in a cold condition. However, when the reactor is in a hot condition, a spring of the plurality of springs is in a free state wherein a free end of the spring is in an uncompressed state and is disengaged from the upper core plate. In another embodiment, the spring apparatus employs a support apparatus that is also in accordance with the disclosed and claimed concept and that includes one or more bumpers that engage the springs of a spring pack from the underside.

Accordingly, an aspect of the disclosed and claimed concept is to provide an improved spring apparatus that is usable in a nuclear installation.

Another aspect of the disclosed and claimed concept is to provide such a spring apparatus that includes a support apparatus having one or more bumpers that are situated generally between the springs and the fuel assembly and that compressively engage the springs that are situated above it to provide enhanced performance.

Another aspect of the disclosed and claimed concept is to provide another such spring apparatus having a plurality of springs whose compressive engagement with an upper core plate of the nuclear reactor is based upon the temperature of a reactor.

Accordingly, an aspect of the disclosed and claimed concept is to provide an improved support apparatus that is usable with a spring apparatus of a nuclear installation, the spring apparatus having a plurality of elongated springs that are stacked together one upon the other and that are affixed at an end thereof to a top nozzle of a fuel assembly of the nuclear installation, the plurality of springs at a location thereon that is spaced from the first end being engaged with an upper core plate of the nuclear installation, the plurality of springs engaged between the top nozzle and the upper core plate being deformed between a compressed state and another compressed state when the nuclear installation is operated between a cold condition and a hot condition. The support apparatus can be generally stated as including a support that is plate-like and that is structured to take the place of a spring of the plurality of springs that has been removed from the spring apparatus, the support further being structured to be stacked together with a number of remaining springs of the plurality of springs and to be affixed at an end thereof to the top nozzle, and an abutment apparatus that comprises a bumper that is affixed to the support and that is spaced a first distance from the first end, the bumper protruding a second distance away from a surface of the support in a direction generally toward the number of remaining springs and being structured to engage the number of remaining springs at a position on the number of remaining springs disposed between the end and the location during at least a portion of the deformation between the compressed state and the another compressed state.

Another aspect of the disclosed and claimed concept is to provide an improved spring apparatus that is structured for use in a nuclear installation. The spring apparatus can be generally stated as including a number of elongated springs, a support apparatus comprising a plate-like support and an abutment apparatus that is situated on the support, the number of springs and the support being stacked together one upon the other and being structured to be affixed at an end thereof to a top nozzle of a fuel assembly of the nuclear installation, the number of springs at a location thereon that is spaced from the first end being structured to be engaged with an upper core plate of the nuclear installation, the number of springs engaged between the top nozzle and the upper core plate being deformed between a compressed state and another compressed state when the nuclear installation is operated between a cold condition and a hot condition, and the abutment apparatus comprising a bumper that is affixed to the support and that is spaced a first distance from the first end, the bumper protruding a second distance away from a surface of the support in a direction generally toward the number of springs and being structured to engage the number of springs at a position on the number of springs disposed between the end and the location during at least a portion of the deformation between the compressed state and the another compressed state.

Another aspect of the disclosed and claimed concept is to provide an improved spring apparatus that is structured for use in a nuclear installation. The spring apparatus can be generally stated as including a plurality of elongated springs that are stacked together one upon the other and that are affixed at a first end thereof to a top nozzle of a fuel assembly of the nuclear installation, when the nuclear installation is in a cold condition, the plurality of springs being in a compressed state and each being compressively engaged at a location thereon that is spaced from the first end with an upper core plate of the nuclear installation, and when the nuclear installation is in a hot condition: a subset of the plurality of springs consisting of fewer than all of the plurality of springs being in another compressed state and each being compressively engaged with the upper core plate, and a spring of the plurality of springs being in a free state wherein a second end thereof opposite the first end is uncompressed and is disengaged from the upper core plate.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
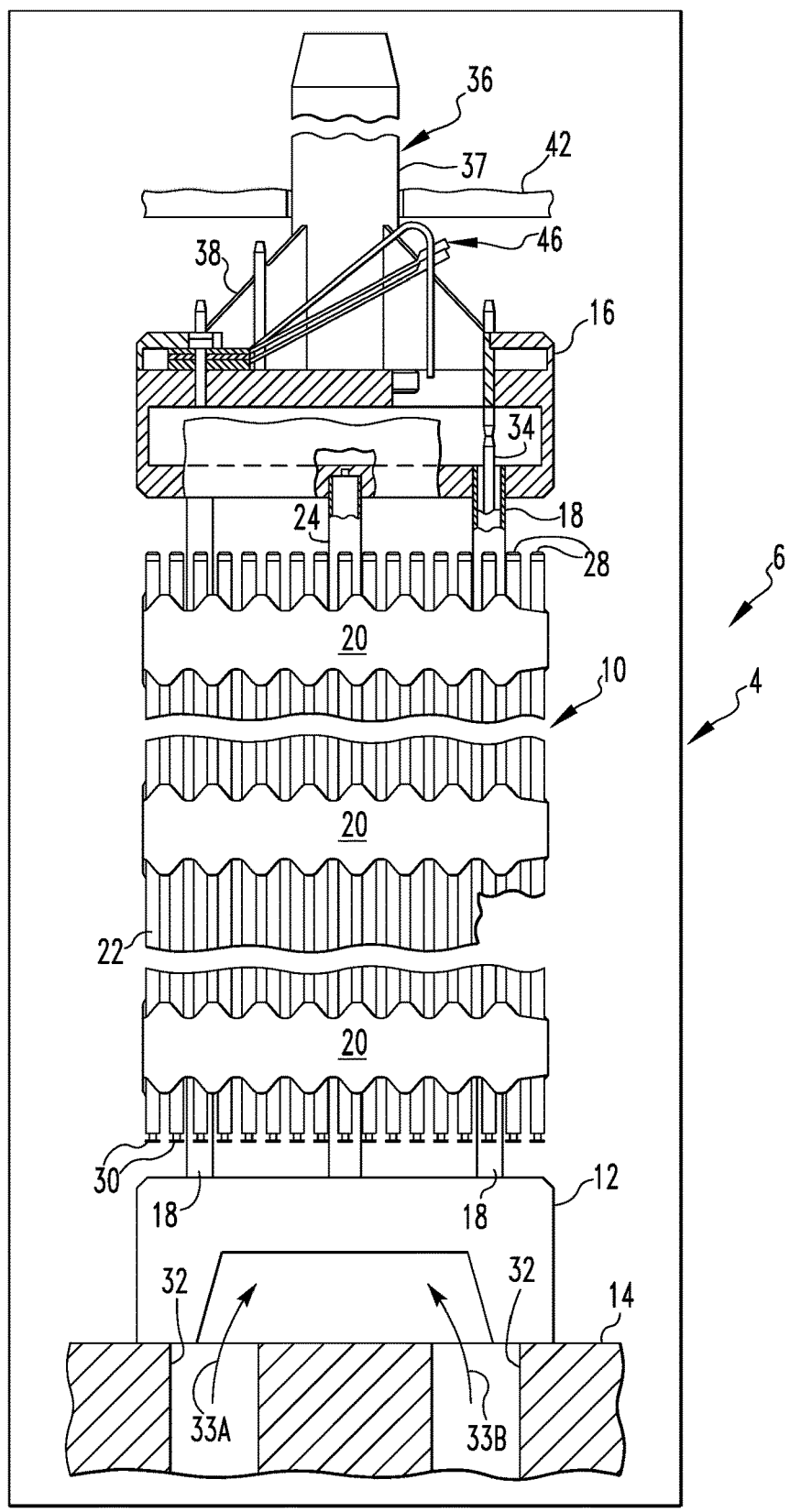
FIG. 1 is an exemplary depiction of a pressurized water nuclear reactor of a nuclear installation and having a conventional spring pack.

An exemplary fuel assembly 10 mounted in a schematically depicted nuclear reactor 4 of a nuclear installation 6 is depicted generally in FIG. 1. One or more of the various components of the fuel assembly 10 and/or other components can be referred to as the internals 14 and 42 of the reactor 4.

The fuel assembly 10 includes a bottom nozzle 12 that supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the exemplary fuel assembly 10 depicted in FIG. 1 includes an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the reactive power of the nuclear reactor 4.

A liquid moderator/coolant such as water, or water containing boron, is pumped upwardly through a plurality of flow openings 32 in the lower core support plate 14 to the fuel assembly 10. Such flow is represented by a number of arrows that are indicated at the numerals 33A and 33B. As employed herein, the expression "a number of" and variations thereof shall refer broadly to any non-zero quantity, including a quantity of one. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected to a control rod 34 such that the control mechanism 36 is operable to move the control rods 34 vertically in the thimble tubes 18 to thereby control the fission process in the fuel assembly 10, all in a well-known manner.

The nuclear reactor 4 further includes an upper core support plate 42 that is situated opposite the lower core support plate 14 and between which the fuel assemblies 10 are situated. Each fuel assembly 10 includes a plurality of hold-down springs 46 which, as a general matter, are arranged in four spring packs, one of which is depicted in FIG. 1 as being at the front of the fuel assembly 10, i.e., the part facing the viewer, with the other spring packs not being shown but being situated at the left, right, and rear of the fuel assembly 10. When the upper core support plate 42 is situated atop the hold-down springs 46, the hold-down springs 46 are in an at least slightly compressed state and apply a compressive force to the fuel assembly 10 in the vertically downward direction from the perspective of FIG. 1. Such downward compressive force resists the fuel assembly 10 from being lifted off the lower core support plate 14 due to drag forces from the flow of coolant, as is indicated at the arrows 33A and 33B, acting on the fuel assembly 10.

Figure 2:
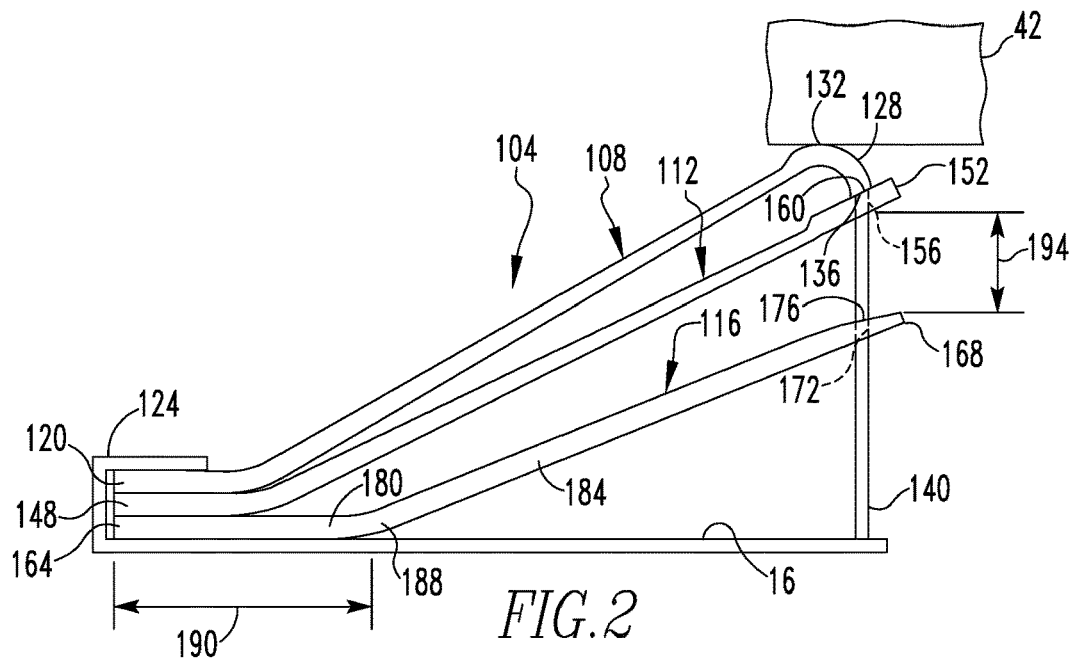
FIG. 2 is an improved spring apparatus in accordance with a first embodiment of the disclosed and claimed that is usable with the reactor of FIG. 1 and is a depiction of the spring apparatus when the reactor is in a hot condition.
Figure 3:
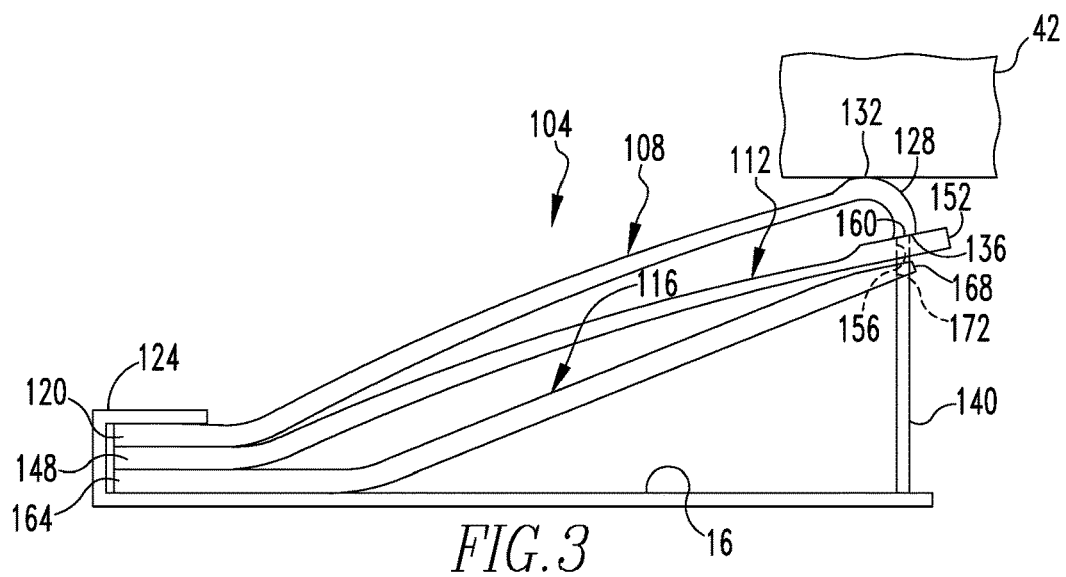
FIG. 3 is a view similar to FIG. 2, except depicting the spring apparatus when the reactor in a condition between the hot condition and a cold condition.
Figure 4:
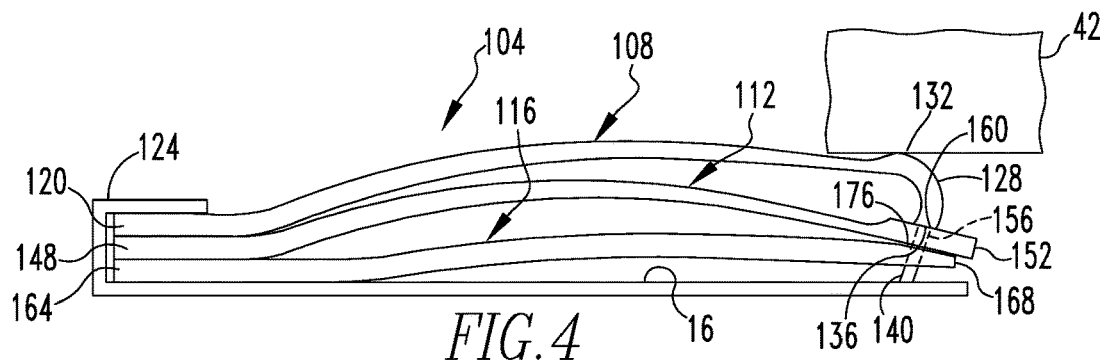
FIG. 4 is a view similar to FIGS. 2 and 3, except depicting the spring apparatus when the reactor is in the cold condition.

An improved spring apparatus 104 in accordance with a first embodiment of the disclosed and claimed concept is depicted in FIGS. 2-4. The spring apparatus 104 includes a plurality of springs that are indicated at the numerals 108, 112, and 116, and each of which is of an elongated plate-like configuration having a length and thickness that are depicted in FIGS. 2-4 and having a width into the plane of the page of FIGS. 2-4. The springs are formed of a material such as Alloy 718 or other appropriate material that is suited to the purpose. The springs 108, 112, and 116 are stacked, one upon the other, and are affixed to the top nozzle 16 of the fuel assembly 10.

As can be understood from FIGS. 2-4, the spring 108 is situated atop the other springs 112 and 116, and it has a first end 120 that is secured in a mount 124 atop the fuel assembly 10, it being noted that the springs 112 and 116 are likewise secured to the fuel assembly 10 with the mount 124. The spring 108 additionally has a bend 128 formed therein, and the upper core plate 42 engages the spring 108 at an engagement location 132 thereon that is located on the bend 128. The bend 128 terminates at a ledge 136, and the spring 108 further includes a relatively narrower tail 140 that extends from the ledge 136 and includes a set of latching structures that are engaged with an interior surface of the top nozzle 16 of the fuel assembly 10.

The spring 112 likewise includes a first end 148 that is secured to the mount 124. The spring 112 further includes a second end 152 opposite the first end 148 and has an opening 156 formed therein near the second end 152. The tail 140 is slidingly received in the opening 156. Furthermore, the spring 112 includes an engagement location 160 adjacent the opening 156 that engages the ledge 136 and thus is compressively engaged with the upper core plate 42 via the spring 108.

In a similar fashion, the spring 116 has a first end 164 and a second end 168 opposite one another and further has an opening 172 formed therein near the second end 168 through which the tail 140 is slidingly received. Furthermore, the spring 116 has an engagement location 176 thereon situated adjacent the opening 172 that is engageable with the underside of the spring 112 and thus, via the spring 112 and the spring 108, is compressively engageable with the upper core plate 42, as is depicted in FIG. 4.

As can be seen in FIGS. 2-4, the spring 116 can be said to have a first portion 180 that is engaged with the top nozzle 16 of the fuel assembly 10 and to have a second portion 184 opposite the first portion 180 and to further have a bend 188 situated between the first and second portions. In the depicted exemplary embodiment, the spring 116 is of a generally constant thickness, thereby minimizing the expense to form it. The first portion 180 can be said to be of a length 190.

As a general matter, FIG. 2 depicts the spring apparatus 104 in a hot state of the nuclear reactor 4, and in such hot state the second end 168 of the spring 116 is spaced away from an underside the second end 152 of the spring 112 by a space 194. It thus can be seen that in the hot condition of FIG. 2, the spring 116 is in a free state wherein only its first end 164 is affixed to the top nozzle 16 of the fuel assembly 10 and wherein the second end 168 is disengaged from the upper core plate 42 and is unengaged with the top nozzle 16. That is, in the free state of FIG. 2 that corresponds with the hot condition of the nuclear reactor 4, the spring 116 is in an undeflected free state disengaged from the upper core plate 42 and with the second end 168 at most only being slidably engaged with the tail 140 that is received in the opening 172.

On the other hand, FIG. 4 depicts the spring apparatus 104 when the nuclear reactor 4 is in a cold state, such as either at startup or immediately prior to shut down. In such a condition, it can be seen that the springs 108 and 112 remain compressively engaged with the upper core plate 42, but in the cold state of FIG. 4 the spring 116 is additionally compressively engaged with the upper core plate 42 by being compressively engaged with the undersurface of the spring 112 and by being, in turn, compressively engaged with the ledge 136 and thus the upper core plate 42.

FIG. 3 represents a transition point between the hot condition of the reactor 4 of FIG. 2 and the cold condition of the reactor 4 of FIG. 4. FIG. 3 thus could be characterized as the point between the state in which the spring 116 is compressively engaged with the upper core plate 42 (as in FIG. 4) and the state in which the spring 116 is in its free state wherein it is in an uncompressed condition (as is indicated in FIG. 2).

Figure 5:
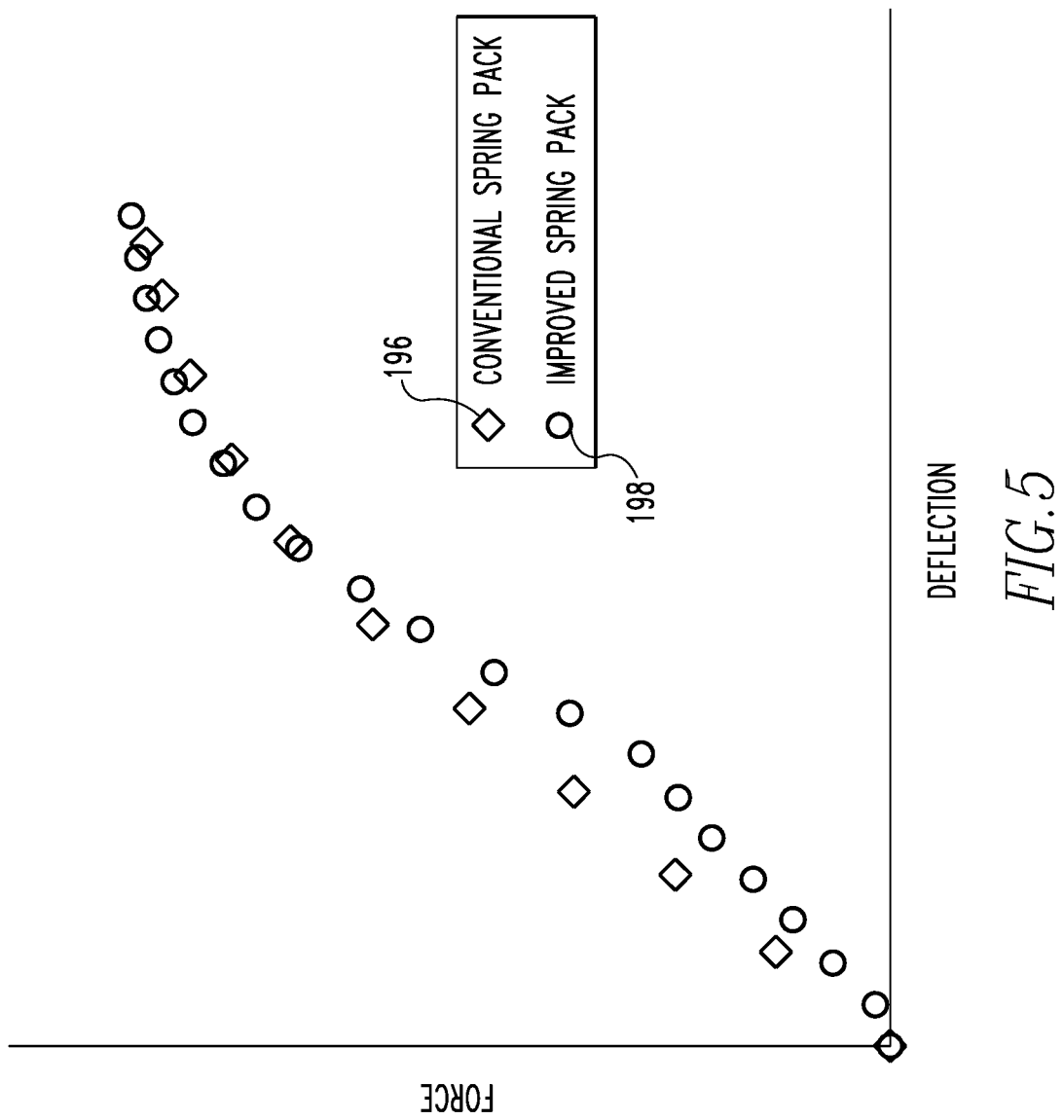
FIG. 5 is a graph depicting load/deflection curves for the conventional spring pack of FIG. 1 and for the improved spring apparatus of FIGS. 2-4.

As can be understood from FIG. 5, a plurality of data points indicated at the numeral 198 are plotted for compressive force of the spring apparatus 104 versus deflection. Additionally, a plurality of load/deflection data points 196 are plotted for the hold-down springs 46 that are depicted in FIG. 1. As can be seen in FIG. 5, the data points 198 demonstrate slightly higher compressive forces for the spring apparatus 104 at the higher deflection values, which occur during the cold condition of the nuclear reactor 4 such as is depicted generally in FIG. 4. On the other hand, FIG. 5 demonstrates that the compressive forces indicated by the data points 198 are less than those of the data points 196 in the hot condition of the reactor 4, which would be in the range of approximately 0.500-1.250 inches of deflection.

As mentioned above, the transition between cold operation and hot operation of the nuclear reactor 4 involves many complex factors that affect the compressive loading by the hold-down springs on the fuel assembly 10. Depending upon such factors, a given nuclear reactor may have compressive forces that are excessive during hot operation of the reactor and/or may have compressive forces that are undesirably low during cold operation of the reactor. The improved spring apparatus 104 would be advantageously implemented into such a reactor because, as can be seen in FIG. 5, implementation of the spring apparatus 104 results in reduced compressive forces during hot operation and slightly increased compressive forces during cold operation.

It can further be understood that by varying the length 190 and the space 194, the various compressive performance characteristics of the spring 116 can be varied to provide specific load/deflection performance that is tailored to the particular needs of any given nuclear installation, of which the nuclear installation 6 is merely an example. By advantageously configuring the spring apparatus 104 such that the spring 116 is only compressively engaged with the upper core plate 42 at temperatures below that where the transition situation of FIG. 3 occurs, improved cold compressive performance can be obtained in conjunction with reduced hot temperature compressive forces.

Other variations will be apparent. For instance, two springs or more may be engaged with the upper core plate 42 when the reactor 4 is cold but be disengaged therefrom when the reactor 4 is hot. Similarly, three or more springs could remain engaged with the upper core plate 42 when the reactor 4 is hot. Other examples can be envisioned.

Figure 6:
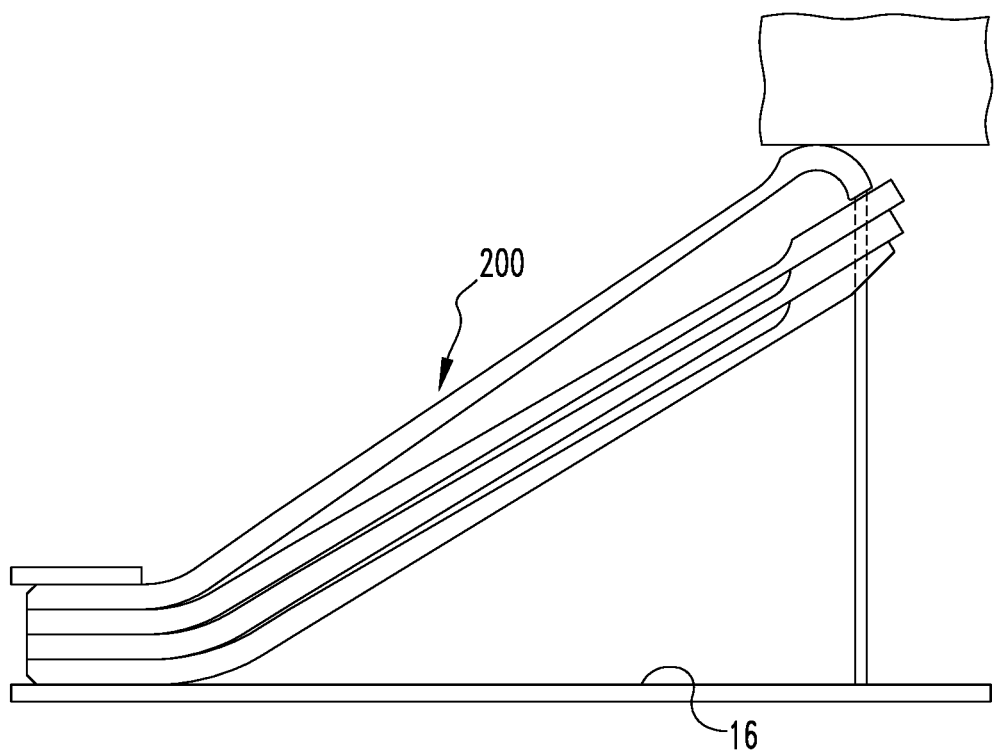
FIG. 6 is another conventional set of hold-down springs that is usable with the reactor of FIG. 1.

Another previously known spring pack is depicted generally in FIG. 6. FIG. 6 depicts a four-spring set of hold-down springs 200 that are similar to the hold-down springs 46 of FIG. 1, it being noted that the set of hold-down springs 200 of FIG. 6 includes four springs whereas the set of hold-down springs 46 includes only three springs. Three spring designs and four spring designs are well known in the relevant art, and it is understood that the advantageous teachings herein can be applied to either such configuration.

Figure 7:
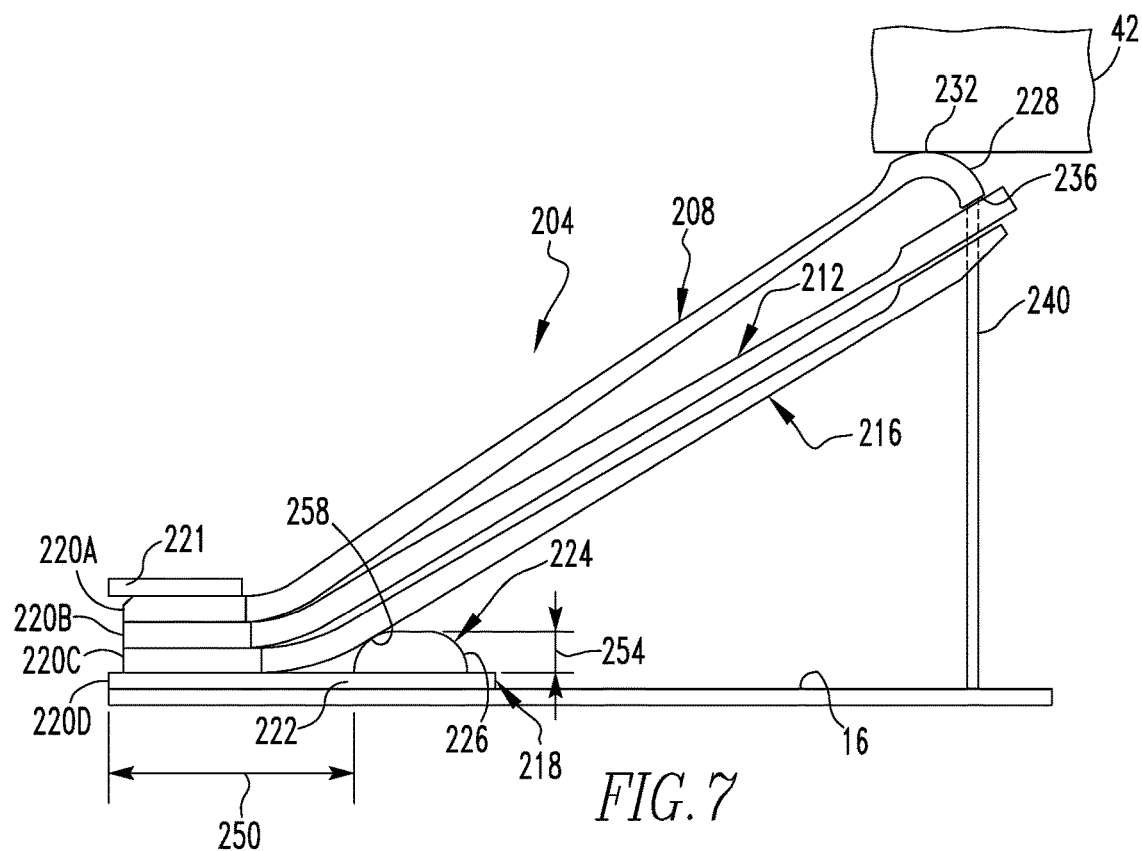
FIG. 7 is an improved spring apparatus in accordance with a second embodiment of the disclosed and claimed concept that includes a support apparatus that is likewise in accordance with the disclosed and claimed concept that is usable with the reactor of FIG. 1 and is a depiction of the spring apparatus when reactor is in a hot condition.
Figure 8:
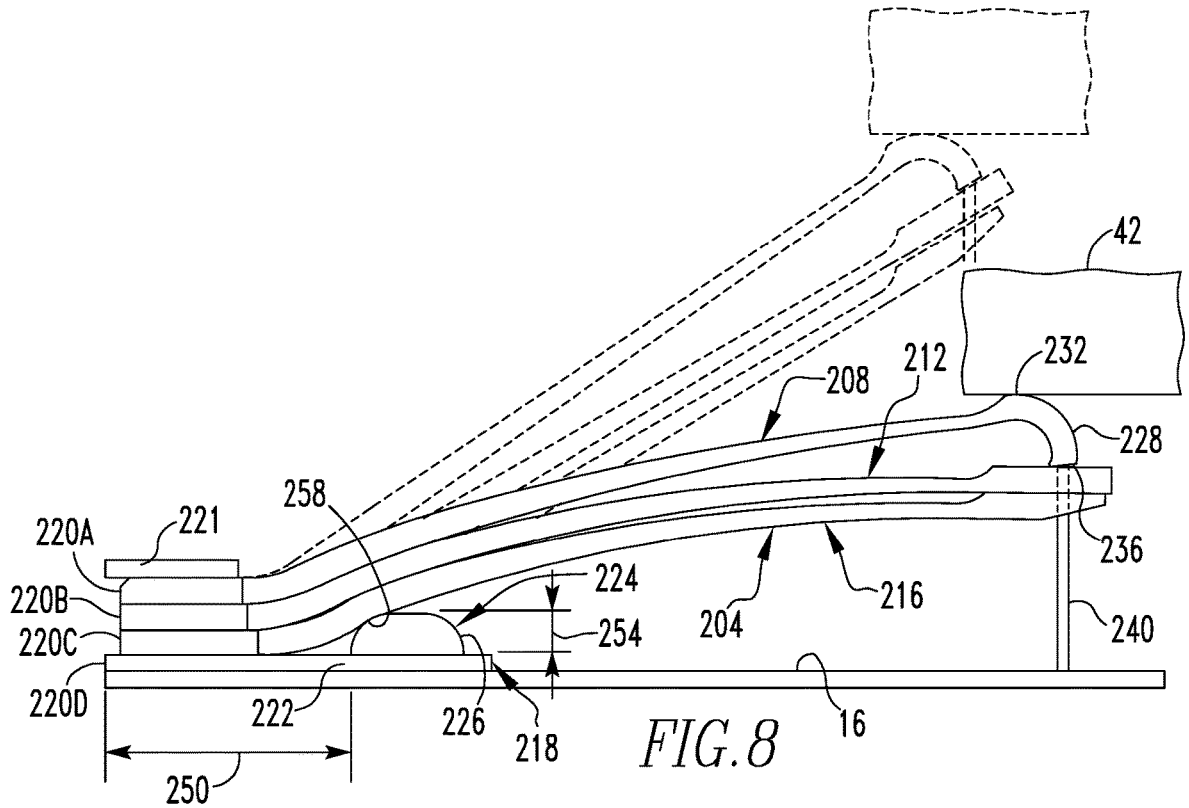
FIG. 8 is a view similar to FIG. 7, except depicting the spring apparatus and the support apparatus when the reactor is in a cold condition.

An improved spring apparatus 204 in accordance with a second embodiment of the disclosed and claimed concept is depicted generally in FIGS. 7 and 8. The spring apparatus 204 is similar to the set of hold-down springs 200, except that a support apparatus 218 is provided in place of the bottom-most spring of the spring apparatus 204. That is, and as can be seen in FIG. 7, the spring apparatus 204 can be said to include a spring 208, a spring 212, and a spring 216, along with the support apparatus 218. The spring apparatus 204 potentially can be formed by removing the bottom-most spring from the set of hold-down springs 200 and replacing it with the support apparatus 218 in order to form the spring apparatus 204. Alternatively, the spring apparatus 204 can be formed by configuring the three springs 208, 212, and 216, together with the spring apparatus 218 to form the spring apparatus 204.

The support apparatus 218 can be said to include a plate-like support 222 and an abutment apparatus 224 situated atop the support 222. In the depicted exemplary embodiment, the support apparatus 218 is co-formed as a single piece item by machining it from a block of stainless steel to form the support 222 with the abutment apparatus 224 situated thereon. In the depicted exemplary embodiment, the abutment apparatus 224 includes bumper 226 that is situated on the support 222.

As can be seen in FIG. 7, the springs 208, 212, and 216 each have a first end 220A, 220B, and 220C, respectively, and the support 222 similarly has a first end 220D. The first ends 220A, 220B, 220C, and 220D are affixed with a mount 221 to the top nozzle 16 of the fuel assembly 10 (of FIG. 1).

The springs 208, 212, and 216 are themselves similar to the hold-down springs 46, and in this regard it can be seen that the spring 208 is an elongated flat plate-like structure having a bend 228 opposite the first end 220A and having an engagement location 232 situated atop the bend 228. The bend 228 terminates in a ledge 236 from which extends a relatively narrower tail 240 which has latching structures opposite the bend 228 that engage an underside of the top nozzle 16 of the fuel assembly 10. The tail 240 is slidingly received through openings formed in the springs 212 and 216.

As can be understood from FIG. 7, the bumper 226 is spaced a first distance 250 from the first end 220D of the support 222. The bumper 226 protrudes from the upper surface of the support 222 a second distance 254 in a direction generally away from the fuel assembly 10 and in a direction generally toward the spring 216. The bumper 226 engages the spring 216 at a position 258 thereon both in the hot condition of the nuclear reactor 4, such as is depicted generally in FIG. 7, as well as in the cold condition of the reactor 4, such as is depicted generally in FIG. 8. It is understood that the first and second distances 250 and 254 can be tailored in other embodiments such that the bumper 226 may be disengaged from the spring 216 at a given temperature of the nuclear reactor 4 or at a certain time during the lifetime of the components of the nuclear reactor 4, but in the depicted exemplary embodiment the bumper 226 is engaged with the spring 216 at all times. The size and shape of the bumper 226 can likewise be varied for such purposes.

Figure 11:
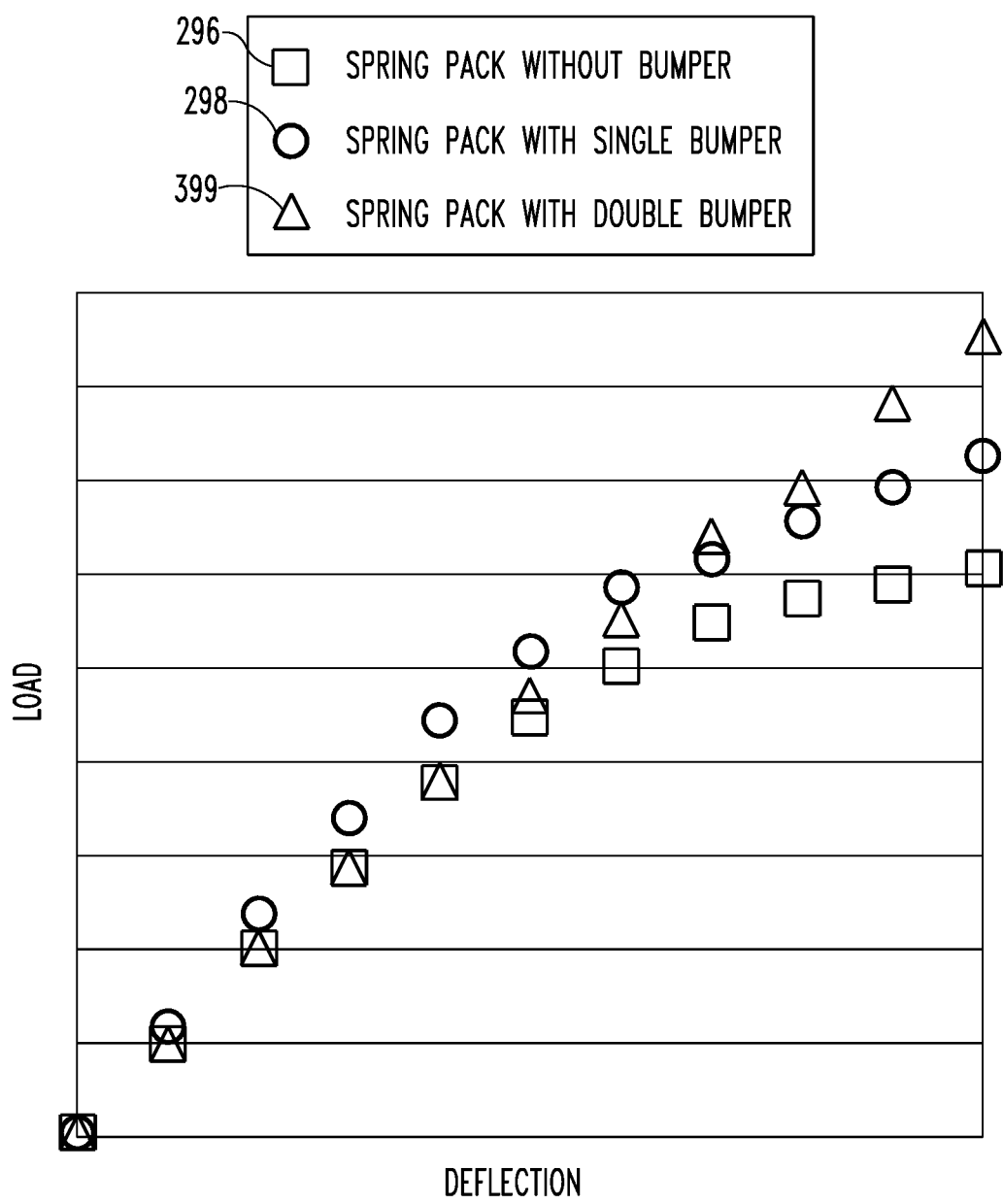
FIG. 11 is another graph depicting load/deflection curves of the conventional spring pack of FIG. 6, the improved spring apparatus of FIGS. 7 and 8, and the improved spring apparatus of FIGS. 9 and 10.

As can be understood from FIGS. 7 and 8, when the nuclear reactor 4 transitions from the hot condition of FIG. 7 to the cold condition of FIG. 8, the spring 216 compressively engages the bumper 226, and that the springs 212 and 208 likewise compressively engage the bumper 226 by compressively engaging one another and the spring 216. By spacing the bumper 226 from the first end 220D such that the bumper 226 engages the springs 208, 212, and 216 at the position 258 that is between the first ends 220A, 220B, and 220C and the opposite ends, the deflection characteristics of the spring apparatus 204 can be configured to be different than those of the set of hold-down springs 200. For example, FIG. 11 depicts a set of data points which are indicated generally at the numeral 296 of compressive load versus deflection for the set of hold-down springs 200. Likewise, another set of data points 298 represent load/deflection values for the improved spring apparatus 204. The improved spring apparatus 204 provides increased compressive load at each deflected value when compared with the deflection points 296 of the set of hold-down springs 200 of FIG. 6. The spring apparatus 204 thus would be advantageously employed in an application, such as the nuclear reactor 4, or other reactor, wherein greater compressive loading in both the hot condition and the cold condition of the reactor are desired.

It is understood that the first and second distances 250 and 254 can be varied to provide whatever load/deflection characteristics are desired for a spring apparatus. For instance, it may be desirable to increase the first distance 250 while keeping the second distance 254 unchanged. Other variations will be apparent.

Figure 9:
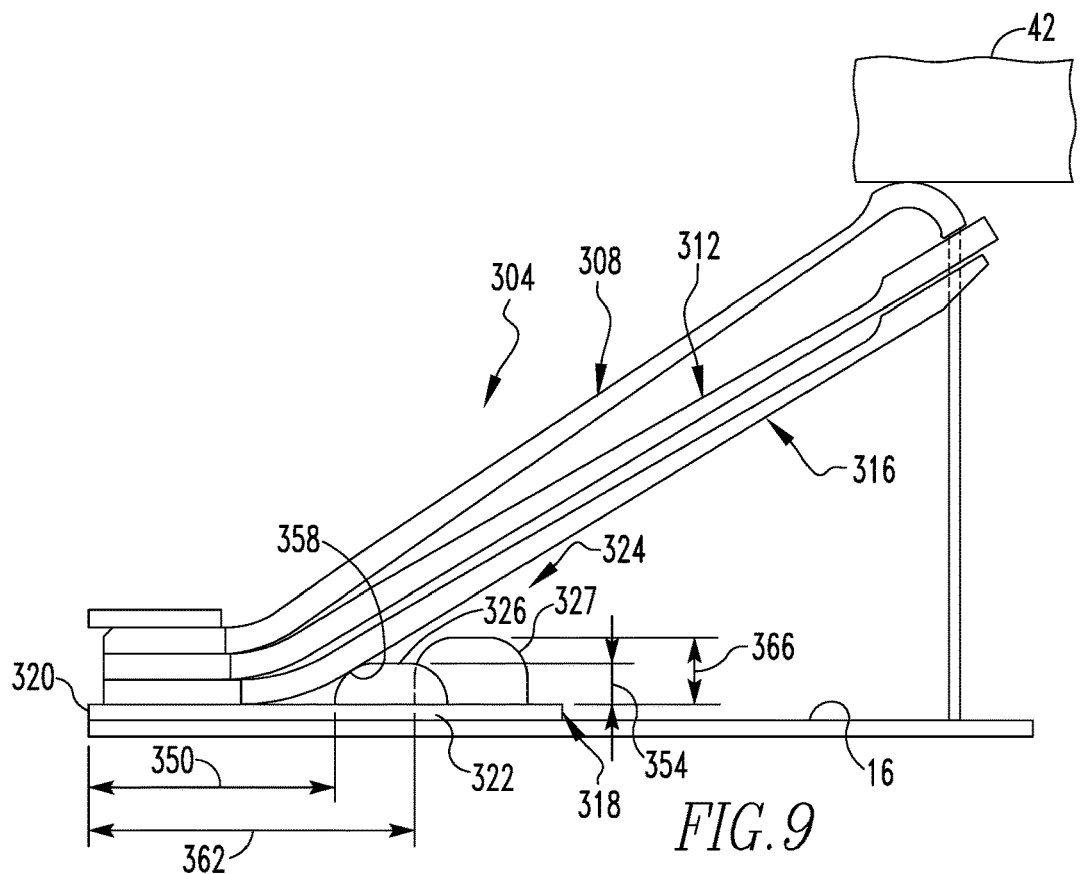
FIG. 9 is an improved spring apparatus in accordance with a third embodiment of the disclosed and claimed concept that includes another support apparatus that is likewise in accordance with the disclosed and claimed concept that is usable with the reactor of FIG. 1 and is a depiction of the spring apparatus when reactor is in a hot condition.
Figure 10:
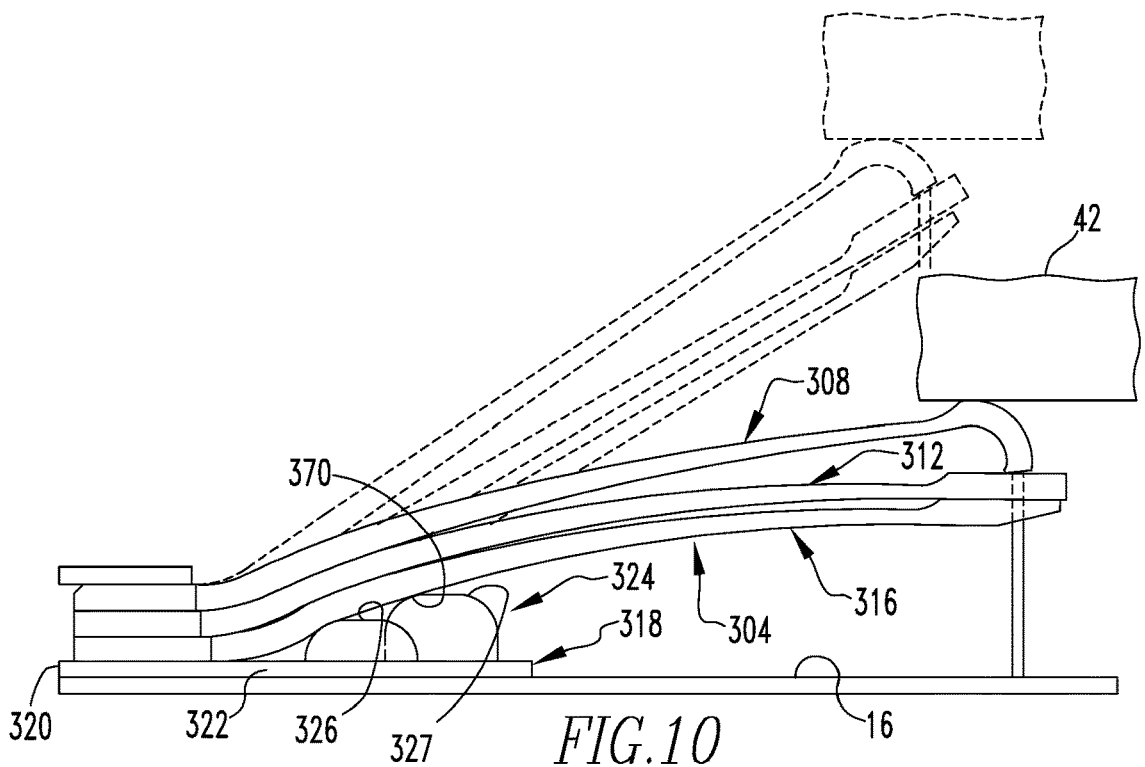
FIG. 10 is a view similar to FIG. 9, except depicting the spring apparatus when the reactor is in a cold condition.

An improved spring apparatus 304 in accordance with a third embodiment of the disclosed and claimed concept is depicted generally in FIGS. 9 and 10. The spring apparatus 304 is similar to the spring apparatus 204, except that the spring apparatus 304 includes an additional bumper. That is, the spring apparatus 304 includes three springs 308, 312, and 316, along with a support apparatus 318, and they are stacked one upon the other and are affixed at a first end to the top nozzle 16 of the fuel assembly 10. The support apparatus 318 includes a support 322 that is similar to the support 222 and further includes an abutment apparatus 324. The abutment apparatus 324 includes a bumper 326 and a bumper 327. In the depicted exemplary embodiment, the bumper 326 is spaced a first distance 350 from the first end 320 and protrudes a second distance 354 in the direction of the spring 316 from an upper surface of the support 322. The bumper 326 engages the spring 316 and thus also the springs 308 and 312, at a first position 358 on the spring 316. In the depicted exemplary embodiment, such engagement between the bumper 326 and the springs 308, 312, and 316 occurs in both the hot condition of the nuclear reactor 4, such as is depicted generally in FIG. 9, as well as in the cold condition of the nuclear reactor, as is depicted generally in FIG. 10.

However, the bumper 327 is positioned another first distance 362 from the first end 20 and protrudes another second distance 366 from the upper surface of the support 322 in a direction generally toward the spring 316. The another first distance 362 is greater than the first distance 350, and the another second distance 366 is greater than the second distance 354, although this need not necessarily be the case in other embodiments. The bumper 327 engages the spring 316 and thus the springs 308 and 312, at another position 370 on the spring 316.

As can be understood from FIGS. 9 and 10, the bumper 327 is disengaged from the springs 308, 312, and 316 in the hot position of FIG. 9, but becomes engaged with the springs 308, 312, and 316 as the springs 308, 312, and 316 transition from the hot position of FIG. 9 to the cold position of FIG. 10. The bumper 327 provides further compressive engagement with the springs 308, 312, and 316, thus further varying the load/deflection performance of the spring apparatus 304.

As can further be seen in FIG. 11, another set of data points 399 represent the load/deflection characteristics of the improved spring apparatus 304. As can be seen from the data points 399, the spring apparatus 304 has higher compressive forces than the spring apparatus 204 during cold operation, such as in excess of approximately 1.4 inches of deflection, but has reduced compressive forces compared with the spring apparatus 204 during hot operation, such as from 0.25 to 1.4 inches of deflection. It thus can be seen that the spring apparatus 304 might desirably be implemented in an installation where improved cold condition compressive force is primarily what is desired, and possibly if slightly improved hot compressive forces are additionally desirable. FIG. 11 also indicates that the spring apparatus 204 might instead be desirably implemented in an application where improved hot and cold performance is desired. In this regard, it is understood that the first and second distances 350, 354, 362, and 366 can be varied depending upon the needs of the particular application to result in load/deflection performance curves and responses that are appropriate to the particular application. Other variation will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A support apparatus that is usable with a number of springs of a spring apparatus of a nuclear installation, the spring apparatus having a plurality of elongated springs that are stacked together one upon the other and that are affixed at a location thereon to a nozzle of a fuel assembly of the nuclear installation, the number of springs at another location thereon that is spaced from the location being engaged with an upper core plate of the nuclear installation, the number of springs engaged between the nozzle and the upper core plate being deformed between a compressed state and another compressed state when the nuclear installation is operated between a cold condition and a hot condition, the compressed state and the another compressed state being different than one another, the support apparatus comprising:
a support that is structured to be stacked together with the number of springs and to be affixed to the nozzle; and
an abutment apparatus that comprises a bumper that is affixed to the support and that is spaced a first distance from an end of the support, the bumper protruding a second distance away from a surface of the support and being structured to engage the number of springs at a position on the number of springs disposed between the location and the another location during at least a portion of the deformation between the compressed state and the another compressed state.

2. The support apparatus of claim 1 wherein the abutment apparatus further comprises another bumper that is affixed to the support and that is spaced another first distance from the end, the another bumper protruding another second distance away from the surface of the support and being structured to engage the number of springs at another position on the number of springs disposed between the location and the another location during another portion of the deformation between the compressed state and the another compressed state.

3. The support apparatus of claim 2 wherein at least one of:
the another first distance is greater than the first distance; and
the another second distance is greater than the second distance.

4. The support apparatus of claim 2 wherein the another first distance is greater than the first distance, and the another second distance is greater than the second distance.

5. The support apparatus of claim 2 wherein:
the plurality of springs are in the compressed state at the cold condition and are in the another compressed state at the hot condition; and
the bumper and the another bumper are structured to simultaneously engage the number of springs during the deformation between the compressed state and an intermediate compressed state that is between the compressed state and the another compressed state, the compressed state and the another compressed state each being different than the intermediate compressed state.

6. The support apparatus of claim 5 wherein the bumper is structured to engage the number of springs and the another bumper is structured to be disengaged from the number of springs during the deformation between the intermediate compressed state and the another compressed state.

7. A spring apparatus that is structured for use in a nuclear installation, the spring apparatus comprising:
a number of elongated springs;
a support apparatus comprising a support and an abutment apparatus that is situated on the support;
the number of springs and the support being stacked together one upon the other and being structured to be affixed at a location thereon to a nozzle of a fuel assembly of the nuclear installation, the number of springs at another location thereon that is spaced from the location being structured to be engaged with an upper core plate of the nuclear installation, the number of springs engaged between the nozzle and the upper core plate being deformed between a compressed state and another compressed state when the nuclear installation is operated between a cold condition and a hot condition, the compressed state and the another compressed state being different than one another; and the abutment apparatus comprising a bumper that is affixed to the support and that is spaced a first distance from an end of the support, the bumper protruding a second distance away from a surface of the support and being structured to engage the number of springs at a position on the number of springs disposed between the location and the another location during at least a portion of the deformation between the compressed state and the another compressed state.

8. A spring apparatus that is structured for use in a nuclear installation, the spring apparatus comprising:

a plurality of elongated springs that are stacked together one upon the other and that are affixed at a location thereon to a nozzle of a fuel assembly of the nuclear installation;

when the nuclear installation is in a cold condition, the plurality of springs being in a compressed state and each being compressively engaged at another location thereon that is spaced from the location with an upper core plate of the nuclear installation; and when the nuclear installation is in a hot condition:
 a subset of the plurality of springs consisting of fewer than all of the plurality of springs being in another compressed state and each being compressively engaged with the upper core plate, and
 a spring of the plurality of springs being in a free state wherein the spring is uncompressed and is disengaged from the upper core plate.

9. The spring apparatus of claim 8 wherein another spring of the plurality of springs has a tail, and wherein the spring has an opening formed therein, the tail being movably received in the opening.

10. The spring apparatus of claim 9 wherein the spring in the free state is disengaged from the fuel assembly.

11. The spring apparatus of claim 8 wherein the spring is situated relatively closer to the nozzle than the other springs of the plurality of springs.

12. The spring apparatus of claim 8 wherein a portion of the spring in the free state is spaced from the other springs of the plurality of springs.

13. The spring apparatus of claim 8 wherein the spring in the free state is of a substantially unvarying thickness.

* * * * *